(12) United States Patent
Borkar et al.

(10) Patent No.: US 6,847,617 B2
(45) Date of Patent: Jan. 25, 2005

(54) SYSTEMS FOR INTERCHIP COMMUNICATION

(75) Inventors: Shekhar Y Borkar, Beaverton, OR (US); Matthew B. Haycock, Beaverton, OR (US); Stephen R. Mooney, Beaverton, OR (US); Aaron K. Martin, Hillsboro, OR (US); Joseph T. Kennedy, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 484 days.

(21) Appl. No.: 09/817,659

(22) Filed: Mar. 26, 2001

(65) Prior Publication Data

US 2004/0225778 A1 Nov. 11, 2004

(51) Int. Cl.[7] .................... H04L 12/28; G06F 13/00
(52) U.S. Cl. .................. 370/258; 710/100; 710/305
(58) Field of Search .................. 710/305; 375/257, 375/219, 220, 316; 370/254, 257, 258; 709/251

(56) References Cited

U.S. PATENT DOCUMENTS

| | | | |
|---|---|---|---|
| 3,619,504 A | * 11/1971 | De Veer et al. | ............. 375/257 |
| 4,933,933 A | 6/1990 | Dally et al. | |
| 5,379,291 A | * 1/1995 | Herzberg et al. | ........... 370/404 |
| 5,528,168 A | * 6/1996 | Kleveland | .................... 326/30 |
| 5,604,450 A | 2/1997 | Borkar et al. | |
| 5,638,402 A | * 6/1997 | Osaka et al. | ................ 375/257 |

FOREIGN PATENT DOCUMENTS

WO    WO 00/18009    9/1999

OTHER PUBLICATIONS

"Command Response Bus System With Inherent Fault–Isolation Features" by IBM Technical Disclosure Bulletin, Aug. 1986, vol. 29, page No. 1144–1148.*

Thaddeus J. Gabara, et al. "Digitally Adjustable Resistors in CMOS for High–Performance Application." IEEE Journal of Solid–State Circuits vol. 27, No. 8, Aug. 1992, pp. 1176–1185.

Ramin Farjad–Rad, et al. "A 0.4–$\mu$m CMOS 10–Gb/s 4–PAM Pre–Emphasis Serial Link Transmitter." IEEE Journal of Solid–State Circuits. vol. 34, No. 5, May 1999, pp. 580–585.

C. Smythe, "ISO 8802/5 token ring local–area networks." Electronics & Communication Engineering Journal, Aug. 1999, pp. 195–207.

Thomas Starr, et al., "Understanding Digital Subscriber Line Technology." Chapter 7, pp. 202–205, Prentice Hall PTR, Upper Saddle River, NJ, 1999.

* cited by examiner

*Primary Examiner*—Tim Vo
(74) *Attorney, Agent, or Firm*—Alan K. Aldous

(57) ABSTRACT

In some embodiments, the invention involves a system having a first group of integrated circuits connected in a truncated ring fashion, wherein the truncated ring includes a truncated region to allow for additional integrated circuits to be added to the ring. In some embodiments, the invention involves a system having a group of integrated circuits connected in a pseudo ring fashion, wherein the pseudo ring is created by data flow of bi-directional signaling between the integrated circuits. In some embodiments, the invention involves a system having a group of integrated circuits connected in a pseudo differential arrangement in which multiple conductors carrying signals share a common reference signal conductor.

19 Claims, 5 Drawing Sheets

SYSTEMS FOR INTERCHIP COMMUNICATION

BACKGROUND OF THE INVENTION

1. Technical Field of the Invention

The present invention relates to integrated circuits and, more particularly, to systems and circuits for communicating between integrated circuits.

2. Background Art

FIG. 1 illustrates a system 10 of integrated circuits including integrated circuits IC0, IC1, . . . ICn. The integrated circuits are connected through a bus 14. Integrated circuit IC0 may be, but does not have to be, a controller to control IC1 . . . ICn. The various integrated circuits may be the same or IC0 may be different than IC1 . . . ICn. System 10 may be a system that is referred to as multi-drop system in which one or more of integrated circuits IC1 . . . ICn are selectively joined to bus 14. Merely as an example, system 10 may be a memory system in which controller IC0 is a memory controller (either part of a processor chip or in a different chip from the processor) and in which integrated circuits IC1 . . . ICn are, for example, dynamic random access memory (DRAM) chips that are on one or more printed circuit boards (PCBs). They could also be in a multi-processor system.

A voltage source Vs in IC0 provides signals to bus 14. A termination resistor Rs is in IC0. This is referred to as series termination. Termination resistor Rs may be an actual resistor in IC0 or may be inherent in IC0.

Address, data, and control bits on bus 14 may be on separate conductors of bus 14 or they may be, for example, time division multiplexed or packetized. For example, bus 14 may include some conductors used to carry only address bits, some conductors used only to carry only control bits, and some conductors used to carry only data bits. Or, some conductors may be used to transmit some combination of address, control, and/or data bits at different times or through a packetized or arrangement.

FIG. 2 illustrates a system 20 including integrated circuits IC0, IC1, . . . ICn. The integrated circuits are connected through bus 24. IC0 may be a controller to control the other integrated circuits and can be the same as or different than IC0 . . . ICn. FIG. 2 includes a termination resistor Rt which is on a PCB, which may be the PCB to which IC1 . . . ICn are connected or may be on another PCB. The termination arrangement of FIG. 2 is referred to as parallel termination.

FIG. 3 illustrates a system 30 including integrated circuits IC0, IC1, . . . ICn. The integrated circuits are connected through bus 34. IC0 may be a controller to control the other integrated circuits and can be the same as or different than IC. . . . ICn. FIG. 3 includes a termination resistor Rs in IC0 and a termination resistor Rt which is on a PCB, which may be the PCB to which IC1 . . . ICn are connected or may be on another PCB. The termination arrangement of FIG. 3 is referred to as series parallel termination.

Bi-directional signaling refers to using the same conductors to transmit signals in both directions. For example, data may be transmitted either to or from an integrated circuit. If the same conductor is used in both directions, the signaling is bi-directional. The bi-directional signaling may be sequential or simultaneous. In the case of sequential bi-directional signaling, enable signals may be used to, for example, tri-state or turnoff unused drivers or receivers. In the case of simultaneous bi-directional signaling, the threshold voltage of the receiver may be changed depending on the state of the adjacent driver. For example, if the adjacent driver is transmitting a 0, the receiver threshold may be set to Vcc/4. If the remote driver is also 0, the threshold will not be met. If the remote driver is a 1, the Vcc/4 threshold will be met. If the I&t adjacent driver is also transmitting a 1, the receiver threshold may be set to 3Vcc/4. If the remote driver transmits a 1, the threshold will be met and if it transmits a 0, the threshold will not be met.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The present invention involves to systems and circuits for communicating between integrated circuits.

Figure 1:
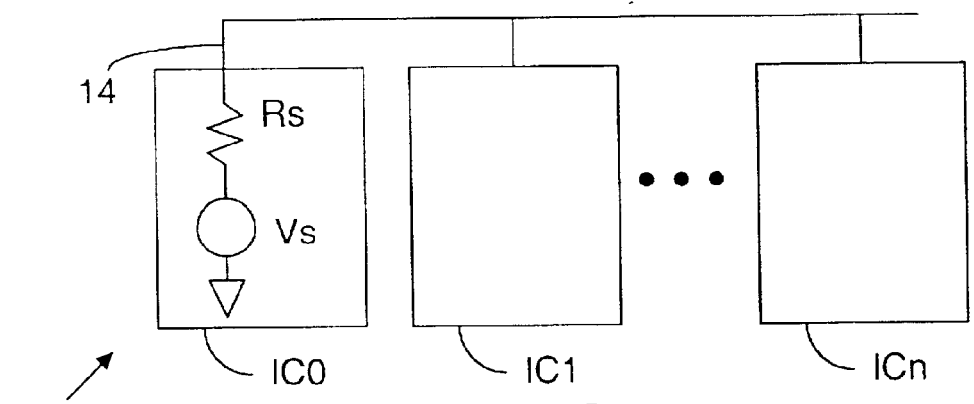
FIG. 1 is a block diagram representation of a prior art system having multiple integrated circuits with a series termination in IC0.
Figure 2:
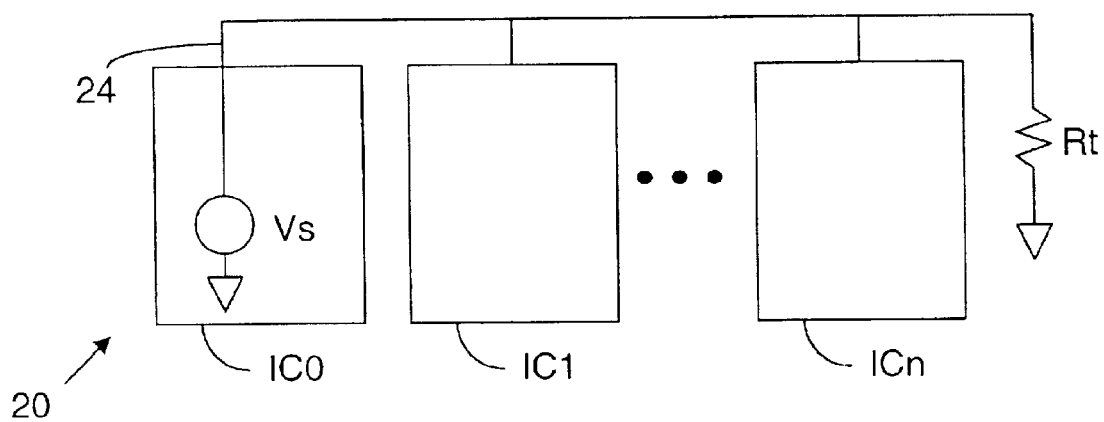
FIG. 2 is a block diagram representation of a prior art system having multiple integrated circuits with parallel termination.
Figure 3:
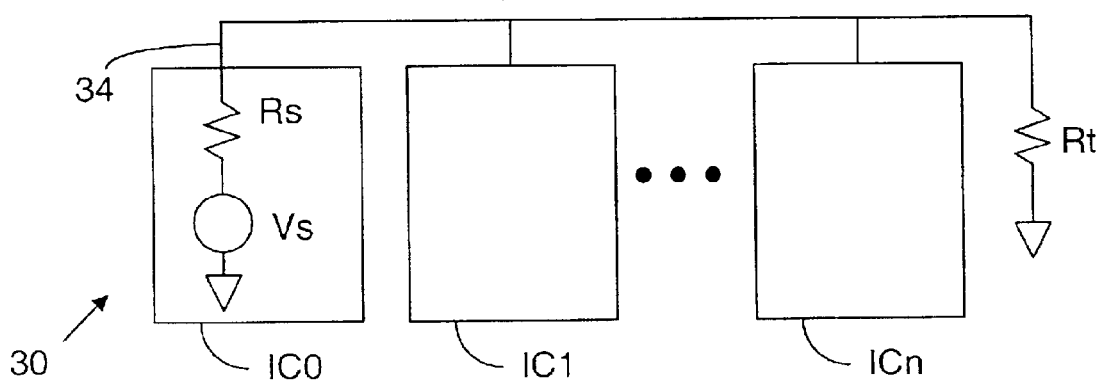
FIG. 3 is a block diagram representation of a prior art system having multiple integrated circuits with series parallel termination.
Figure 4:
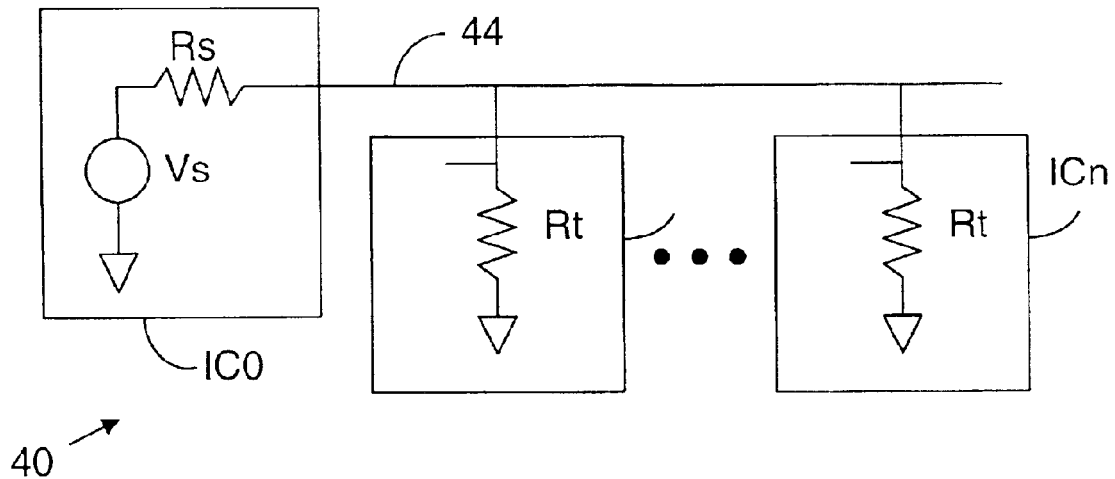
FIG. 4 is a block diagram representation of a system having series parallel termination with a terminating resistor being in the integrated circuits according to some embodiments of the invention.

FIG. 4 illustrates a system 40 with a bus 44 similar to the prior art systems of FIGS. 1 to and 3, except that the termination resistors Rt are in integrated circuits IC1 . . . ICn in a series parallel relationship. In alternative arrangements, the termination resistor Rt might be in only on of integrated circuits IC1 . . . ICn. Also, integrated circuit IC0 may not include termination resistor Rs as in FIG. 2. IC1 . . . ICn in FIG. 4 and in the other figures of this disclosure may be a variety of types of integrated circuits including, for examples, processors, memory devices, communications devices etc. Integrated circuit IC0 may be, for example, a controller of the IC1 . . . ICn and may be the same as or different than IC1 . . . ICn. Merely as examples, IC0 may be a bridge in a chipset or a memory controller. Alternatively, as mentioned, integrated circuit IC0 may be one of several identical chips of which IC1 . . . ICn are others. Bus 44 includes multiple conductors and there would be a different terminating resistor for each conductor in bus 44. Accordingly, resistors Rs and Rt actual each represents multiple resistors connected to different conductors on bus 44. Resistor Rs and Rt can be formed in any of various ways including well known ways.

Figure 5:
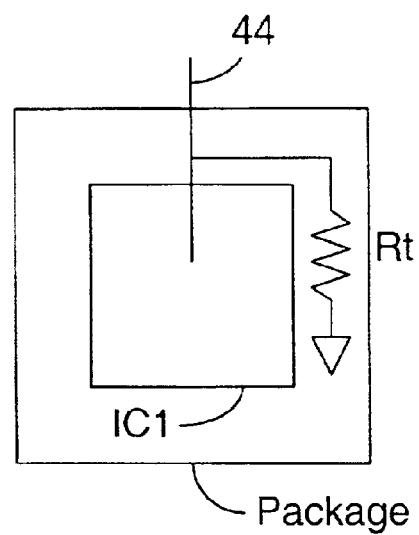
FIG. 5 illustrates a variation of the system of FIG. 4 in which the terminating resistor is in the packaging of integrated circuit IC1 according to some embodiments of the invention.

FIG. 5 illustrates an alternative arrangement in which the termination resistor Rt is in the packaging of IC1 rather than in the chip itself. The same may be true of ICn.

Termination on the die or package may lower overall cost. Signal energy is consumed (in the termination resistor) closer to in the input. Accordingly, there may be better signal integrity. Termination on the die or package may provide better performance and higher frequency of operation. Termination on the die or package may improve other schemes such as simultaneous bi-directional signals.

Figure 6:
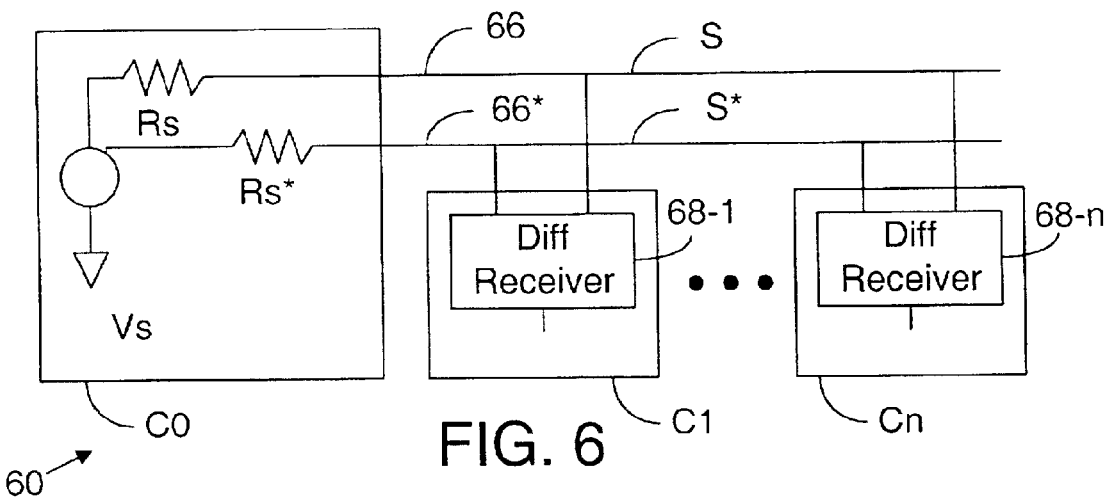
FIG. 6 is a block diagram representation of a system with differential signaling according to some embodiments of the invention.

FIG. 6 illustrates a system 60 having a bus 64 which includes a first set of conductors 66 and a second set of conductors 66*. System 60 is generally similar to those of FIGS. 1-4 except bus 64 carries at least some of its signals differentially. Signals S are carried on conductors 66 and signals S* are carried on conductors 66*, where signals S* are compliments of respective counterparts of signals S. Differential receivers 68-1 . . . 68-n convert the signals S and S* to signal ended signals for use in integrated circuits C1 and Cn. Resistors Rs and Rs* each represent multiple resistors. System 60 may employ any of the termination schemes of FIGS. 1-5.

Figure 7:
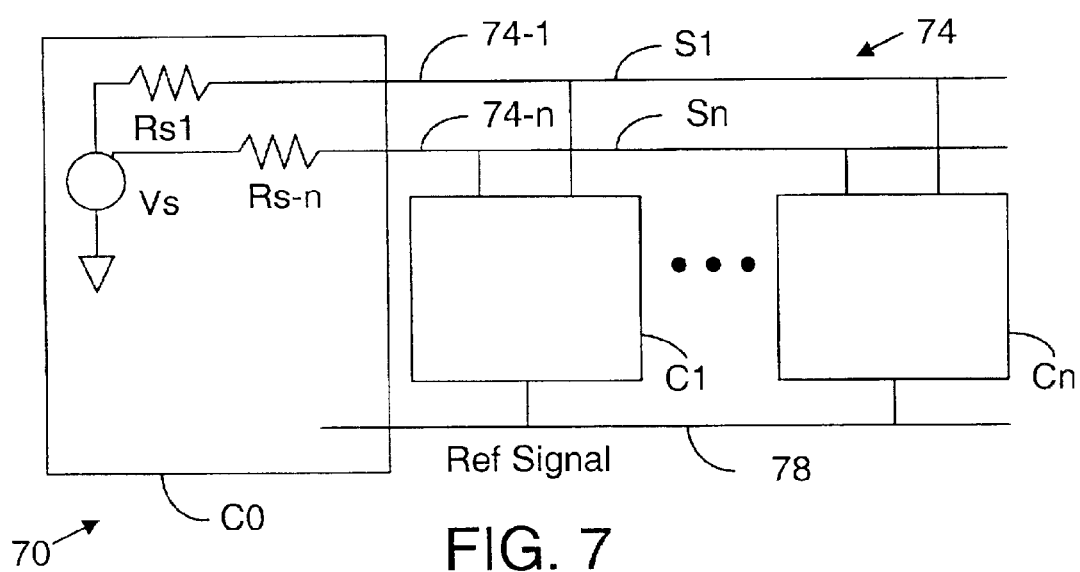
FIG. 7 is a block diagram representation of a system with pseudo differential signaling according to some embodiments of the invention.

FIG. 7 illustrates a system 70 having a bus 74, including conductors 74-1 . . . 74-n. Signals S1 . . . Sn are carried on conductors 74-1 . . . 74-n. Resistors Rs1 . . . Rsn are coupled to conductors 74-1 . . . 74-n, but system 70 could employ any of the termination schemes of FIGS. 1-5. System 70 may be generally similar to system 60 except that system 70 employs a pseudo differential signally scheme, whereas system 60 has a fully differential system. More particularly, at least some of signals S1 . . . Sn on conductors 74-1 . . . 74-n have the same reference signal, which is the reference signal on conductor(s) 78.

Figure 8:
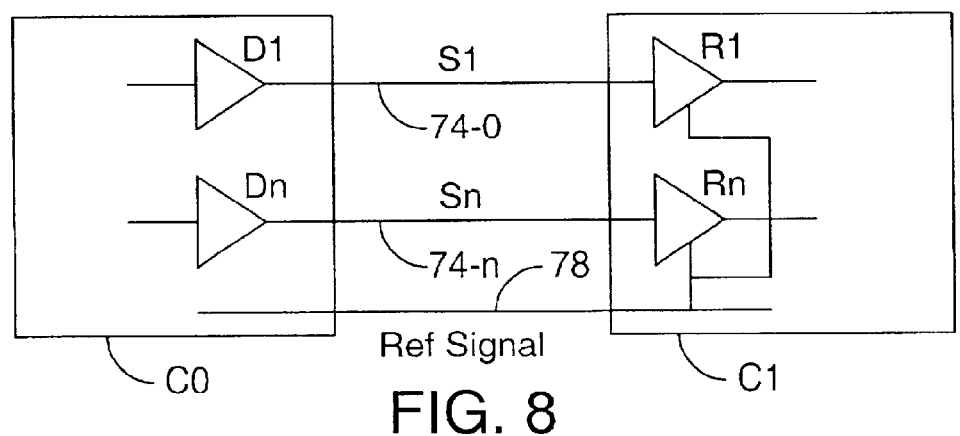
FIG. 8 is a block diagram representation of further detail of some embodiments of FIG. 7.

An example of this is illustrated in FIG. 8, which shows details of a portion of some embodiments of system 70 of FIG. 7. Referring to FIG. 8, integrated circuit C0 includes drivers D1 . . . Dn and integrated circuit C1 includes receivers R1 . . . Rn. Conductor 74-1 is coupled between driver D1 and receiver R1, and conductor 74-n is coupled between driver Dn and 211 receiver Rn. Receivers R1 and Rn use the reference signal on conductor 78 as a reference.

Rather than use the same reference conductor for every one of receivers R1 . . . Rn, there may be a different conductor 78 for every Nth drivers and receivers.

A system like that of FIG. 7 could also include some fully differential and/or signal ended signaling.

Advantages of the system of FIGS. 6-8 may include that since the signaling is differential, it rejects common mode noise, improving signal to noise ratios allowing higher performance (higher frequency). The pseudo differential signaling scheme of FIG. 7 retains most of the benefits of fully differential signaling yet reduces the number of pins and wires, hence reducing cost. The signals described herein may be rail to rail (i.e., from ground potential to full supply voltage) or they may employ low voltage swings. The low voltage swing signals reduce power consumption. Differential and pseudo differential signaling make low voltage swing signaling more practical.

The prior art systems include multi-drop, stubbed bus systems, where a common bus is shard between chips and a controller. This prior art typology is called a star topology.

Figure 9:
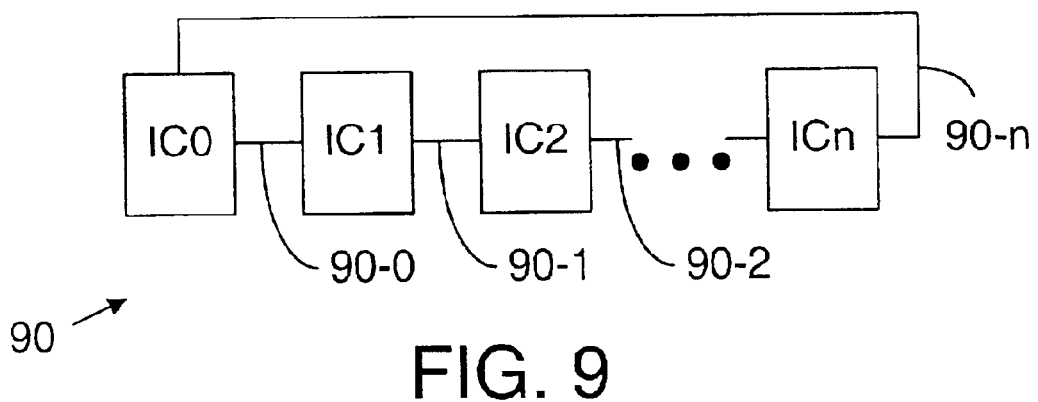
FIG. 9 is a block diagram representation of a complete ring system using point-to-point buses according to some embodiments of the invention.

Various ring topologies have also been developed. FIG. 9 illustrates a system 90 having integrated circuits IC0, IC1, IC2 . . . ICn which form a complete ring through point-to-point busses 90-0, 90-1, 90-2 . . . 90-n. Integrated circuit IC0 may be the same as IC1, IC2 . . . ICn or it could be a different device, such as a controller for them (e.g., a case in which IC0 is a memory controller and IC1, IC2 . . . . ICn are DRAM devices). System 90 may be a multiprocessor system. The buses may be unidirectional or bi-directional, and conductors in the buses may be single ended, fully differential, and/or pseudo differential.

Figure 10:
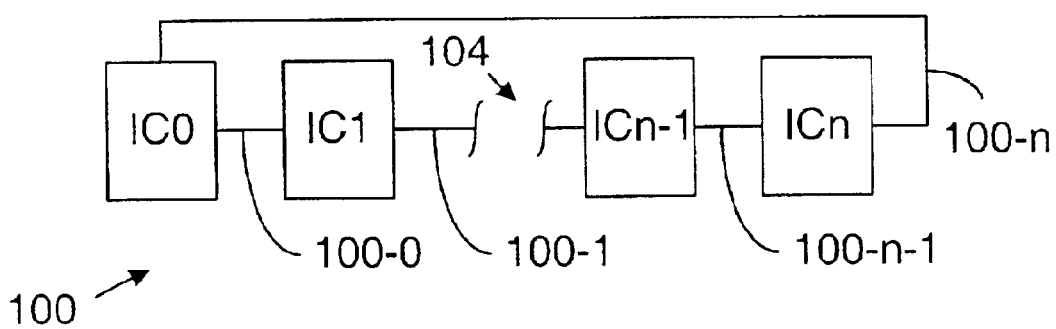
FIG. 10 is a block diagram representation of a truncated ring system using point-to-point buses according to some embodiments of the invention.

FIG. 10 illustrates a system 100 which is a truncated ring including integrated circuits IC0, IC1 . . . ICn−1, and ICn connected through buses 100-0, 100-1, . . . 100-n−1, and 100-n. In a truncated ring, the ring is allowed to stay open to allow future expansion of the system by adding more integrated circuits and optionally closing the ring. At least until the ring is closed through inclusion of additional integrated circuits, the integrated circuits immediately next to truncation region 104 can communicate only in the direction opposite truncation region 104. Accordingly, at least busses 100-1 and 100-n−1 are bi-directional while the ring is open. In some embodiments, all chips communicate bi-directionally. In other embodiments, chips communicate unidirectional as much as possible. Other embodiments may include a combination of unidirectional and bi-directional signaling.

Figure 11:
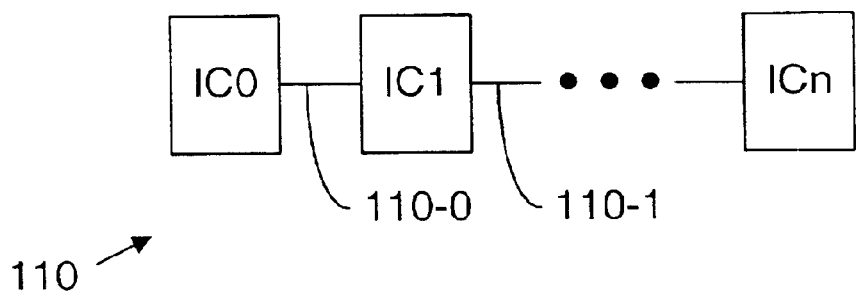
FIG. 11 is a block diagram representation of a pseudo-ring system using point-to-point buses according to some embodiments of the invention.

The rings may be physical, this is, created by conductors explicitly as shown in FIGS. 9, 10, 12, and 13, or may be created implicitly by using bi-directional signaling technology. For example, FIG. 11 illustrates a system 110 having integrated circuits IC0, IC1 . . . ICn coupled through buses 110-0, 110-1, etc. In the case of system 100, the physical bus is not a ring, but through bi-directional signally, a pseudo-ring can be created by dataflow in either direction.

Figure 12:
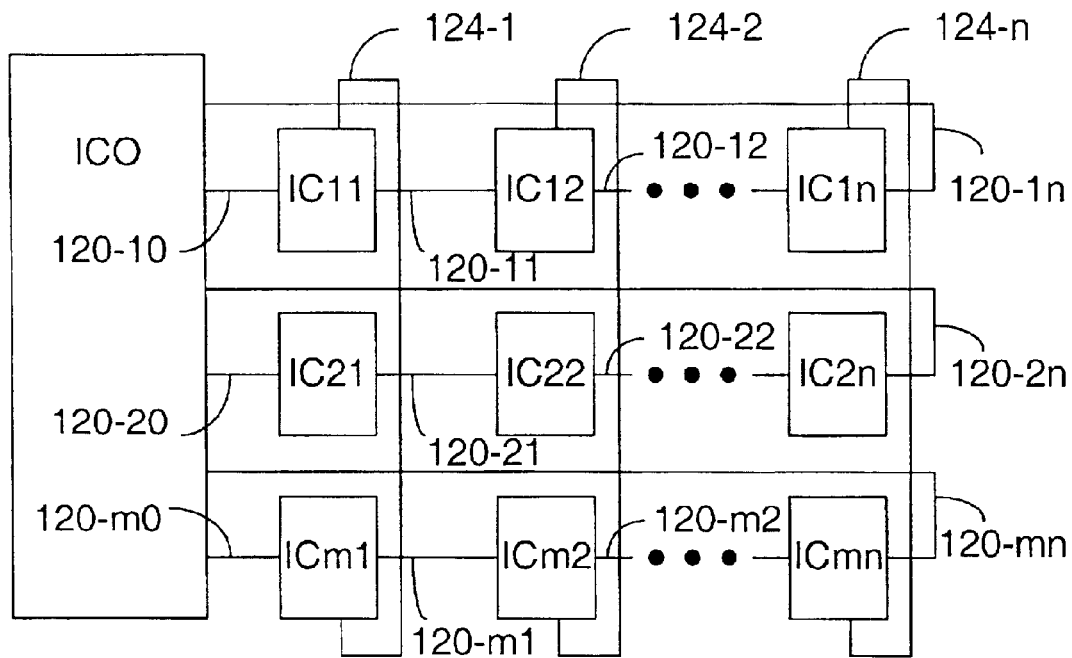
FIG. 12 is a block diagram representation of a multidimensional ring system using point-to-point buses according to some embodiments of the invention.

The concept of the one dimensional ring of FIGS. 9, 10, and 11 can be taken further as illustrated in FIG. 12. In FIG. 12, a system 120 is an n X m two-dimensional torus including integrated circuits IC11, IC12 . . . IC1n, IC21, IC22 . . . , IC2n, . . . , ICm1, ICm2 . . . Icmn. In the embodiments of FIG. 12, IC0 is a controller, such as a memory controller for memory devices or a chipset bridge for a multiprocessor system. Buses 120-10, 120-11, 120-12 . . . 120-1n form a ring for integrated circuits IC0, IC11, IC12 . . . IC1n. Buses 120-20, 120-21, 120-22 . . . 120-2n form a ring for integrated circuits IC0, IC21, IC22 . . . IC2n. Buses 120-10, 120-11, 120-12 . . . 120-in form a ring for integrated circuits IC0, IC1, IC12 . . . IC1n. Buses 124-1 provide communication between integrated circuits IC11 and ICm1. Buses 124-2 provide communication between integrated circuits IC12 and ICm2. Buses 124-n provide communication between integrated circuits IC1n and Icmn.

Additional buses may be added to the two dimensional torus of system 120 to allow additional direct communication. System 120 could be expanded to a three dimensional cube, a four dimensional hypercube, etc. Toruses and other multidimensional topologies may be truncated (see FIG. 10). The pseudo-ring of FIG. 11 can be implemented in the multidimensional rings of, for example, FIGS. 12 and 13. That is, the systems 120 and 130 of FIGS. 12 and 13 can be modified so that rather than include some or all of buses 124-1, 124-2 . . . 124-n and buses 120-1n, 120-2n . . . 120-mn, they act as pseudo rings like FIG. 11.

Figure 13:
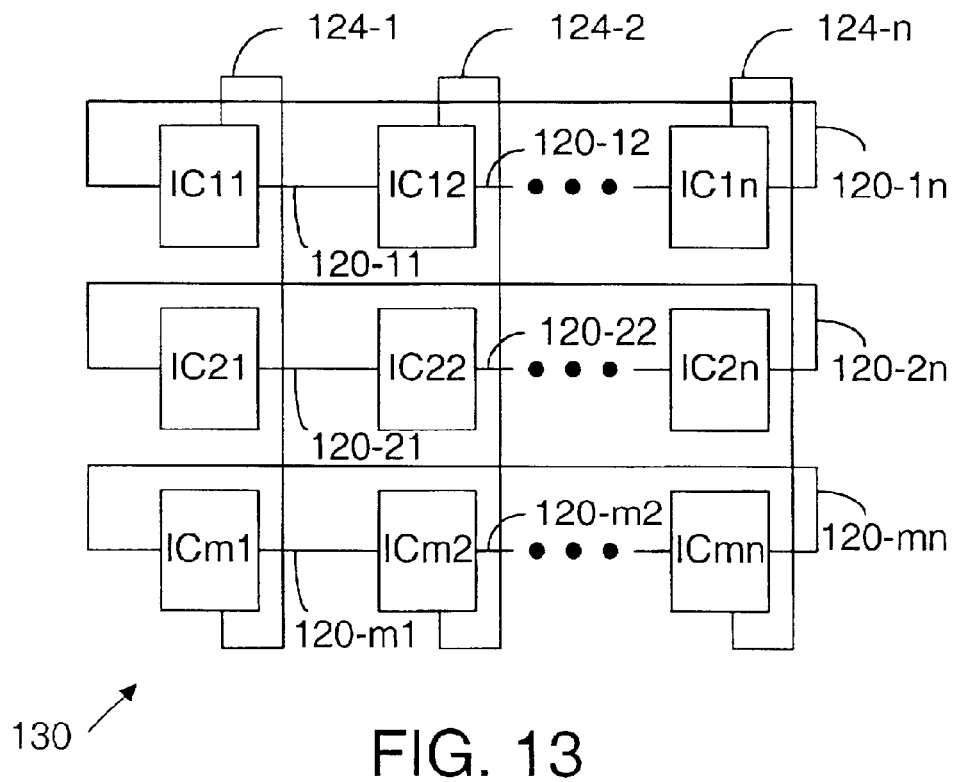
FIG. 13 is a block diagram representation of a multidimensional ring system using point-to-point buses according to some embodiments of the invention.

FIG. 13 is similar to FIG. 12 except that system 130 of FIG. 13 does not include controller IC0.

Rings and multidimensional topologies (including toruses) may include the following advantages. In the ring alone, the average latency to/from a chip may be reduced by half. In the case of multidimensional topologies, the latency may be reduced even further. Truncating a ring or multidimensional ring (see FIG. 10) allows for future expansion.

The systems of FIGS. 6-13 could have various terminal resistance schemes including those shown in FIGS. 1-5.

Systems illustrated as multidrop systems but could be implemented as point-to-point systems and systems illustrated as point-to-point system could be implemented multidrop systems.

It is expected that in actual implementations, there would be additional circuitry not illustrated such as circuitry which is commonly used in integrated circuit interfaces(e.g., electrostatic discharge circuits).

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A system comprising:
    a first group of integrated circuits connected in a truncated ring fashion, wherein the truncated ring includes a truncated region to allow for additional integrated circuits to be added to the ring, wherein when the truncated ring is open, one of the integrated circuits immediately next to the truncated region can communicate only in the direction opposite the truncated region and wherein when the truncated ring is closed, the integrated circuit immediately next to the truncated region can also communicate in the direction toward the truncated region.

2. The system of claim 1, wherein the truncated ring uses point-to-point signaling.

3. The system of claim 1, wherein the truncated ring is a multidimensional ring.

4. The system of claim 1, wherein at least one of the integrated circuits that is not a master controller includes a termination resistor in its die.

5. The system of claim 1, wherein at least one of the integrated circuits that is not a master controller includes a termination resistor in packaging of its die.

6. The system of claim 1, wherein at least two of the integrated circuits include a termination resistor in its die.

7. The system of claim 1, wherein at least one of the integrated circuits includes a termination resistor in packaging of its die.

8. The system of claim 1, wherein one of the integrated circuits acts as a master controller for the other integrated circuits.

9. The system of claim 1, wherein the integrated circuits use differential signaling.

10. The system of claim 1, wherein the integrated circuits use pseudo differential signaling.

11. A system comprising:
    a group of integrated circuits that operate as a ring when the integrated circuits are formed as a ring and which operate as a pseudo ring when there is a truncated region between at least two of the integrated circuits, wherein the pseudo ring is created by data flow of bi-directional signaling between the integrated circuits.

12. The system of claim 11, wherein the pseudo ring is a multidimensional ring.

13. The system of claim 11, wherein at least one of the integrated circuits that is not a master controller includes a termination resistor in its die.

14. The system of claim 11, wherein at least one of the integrated circuits that is not a master controller includes a termination resistor in packaging of its die.

15. The system of claim 11, wherein at least two of the integrated circuits include a termination resistor in its die.

16. The system of claim 11, wherein at least one of the integrated circuits includes a termination resistor in packaging of its die.

17. The system of claim 11, wherein one of the integrated circuits acts as a master controller for the other integrated circuits.

18. The system of claim 11, wherein the integrated circuits use differential signaling.

19. The system of claim 11, wherein the integrated circuits use pseudo differential signaling.

* * * * *

UNITED STATES PATENT AND TRADEMARK OFFICE
CERTIFICATE OF CORRECTION

PATENT NO. : 6,847,617 B2
DATED : January 25, 2005
INVENTOR(S) : Borkar et al.

It is certified that error appears in the above-identified patent and that said Letters Patent is hereby corrected as shown below:

Column 1,
Line 53, delete "IC" and insert -- IC0 --.

Column 2,
Line 6, delete "I&t".

Column 3,
Line 58, delete "211".

Column 4,
Line 61, delete "120-in" and insert -- 120-1n --.
Line 62, delete "IC1" and insert -- IC11 --.

Signed and Sealed this

Twenty-fourth Day of May, 2005

JON W. DUDAS
*Director of the United States Patent and Trademark Office*